(12) United States Patent
Iwasawa et al.

(10) Patent No.: US 9,740,971 B1
(45) Date of Patent: Aug. 22, 2017

(54) NON-TRANSITORY COMPUTER READABLE MEDIUM, INFORMATION PROCESSING DEVICE AND PRINT CONTROL METHOD

(71) Applicant: FUJI XEROX CO., LTD., Tokyo (JP)

(72) Inventors: Masayuki Iwasawa, Yokohama (JP); Issei Matsushita, Yokohama (JP); Yutaka Ikeda, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/208,226

(22) Filed: Jul. 12, 2016

(30) Foreign Application Priority Data

Mar. 22, 2016 (JP) .................................. 2016-057018

(51) Int. Cl.
*G06F 15/00* (2006.01)
*G06K 15/00* (2006.01)
*H04N 1/00* (2006.01)

(52) U.S. Cl.
CPC ....... *G06K 15/403* (2013.01); *H04N 1/00633* (2013.01); *H04N 1/00641* (2013.01); *H04N 2201/0094* (2013.01)

(58) Field of Classification Search
USPC .......................................................... 358/1.15
See application file for complete search history.

(56) References Cited

U.S. PATENT DOCUMENTS

| 8,115,958 B2 | 2/2012 | Tsujimoto | |
|---|---|---|---|
| 8,270,019 B2 | 9/2012 | Ataka | |
| 2008/0018944 A1* | 1/2008 | Morita | H04N 1/00639 358/296 |
| 2009/0027722 A1 | 1/2009 | Tsujimoto | |
| 2009/0147275 A1* | 6/2009 | Hagiwara | G03G 15/5012 358/1.5 |
| 2009/0268244 A1 | 10/2009 | Ataka | |

FOREIGN PATENT DOCUMENTS

| JP | 2009-033241 A | 2/2009 |
|---|---|---|
| JP | 2009-262493 A | 11/2009 |
| JP | 2010-072671 A | 4/2010 |

* cited by examiner

*Primary Examiner* — Saeid Ebrahimi Dehkord
(74) *Attorney, Agent, or Firm* — Oliff PLC

(57) ABSTRACT

A print control method includes, when a sorting method for sorting printed matters in a printing device is set, displaying an image indicating an output aspect of the printed matters output from the printing device, based on the set sorting method and a previous output aspect of the printing device.

5 Claims, 12 Drawing Sheets

| SORTING FUNCTION | LAST SHEET PASSAGE DIRECTION DESIGNATION |
|---|---|
| JOB SEPARATION | VERTICAL DIRECTION OR HORIZONTAL DIRECTION |

| SETTING | SORTING ATTRIBUTE 509 | IDENTIFICATION CHARACTER STRING 510 | SHEET PASSAGE DIRECTION 511 | DISCHARGE DESTINATION 512 | COLOR INFORMATION |
|---|---|---|---|---|---|
| 1 | AUTHENTICATED USER NAME | User A | VERTICAL DIRECTION | STANDARD DISCHARGE TRAY | ▨ 501 |
| 2 | AUTHENTICATED USER NAME | User B | HORIZONTAL DIRECTION | STANDARD DISCHARGE TRAY | ▦ 502 |
| 3 | AUTHENTICATED USER NAME | User C | VERTICAL DIRECTION | OPTION DISCHARGE TRAY | ▤ 503 |
| 4 | AUTHENTICATED USER NAME | User D | HORIZONTAL DIRECTION | OPTION DISCHARGE TRAY | ▨ 504 |
| EXCEPT FOR THE ABOVE | | | VERTICAL DIRECTION | STANDARD DISCHARGE TRAY | ▒ 505 |

600

| SORTING FUNCTION | LAST SHEET PASSAGE DIRECTION DESIGNATION |
|---|---|
| JOB SEPARATION | VERTICAL DIRECTION OR HORIZONTAL DIRECTION |
| OFFSETTING AND DISCHARGING | RIGHT LEFT DIRECTION OR LEFT DIRECTION |
| DISCHARGE DESTINATION SWITCHING | STANDARD DISCHARGE TRAY OR OPTION DISCHARGE TRAY |

NON-TRANSITORY COMPUTER READABLE MEDIUM, INFORMATION PROCESSING DEVICE AND PRINT CONTROL METHOD

CROSS-REFERENCE TO RELATED APPLICATIONS

This application is based on and claims priority under 35 USC 119 from Japanese Patent Application No. 2016-057018 filed on Mar. 22, 2016.

BACKGROUND

1. Technical Field

The present invention relates to a non-transitory computer readable medium, a print control method and an information processing device.

2. Related Art

In many cases, for example, in an office, plural terminals (personal computers) are connected to one printing device (printer) by a network, such as a local area network (LAN), and plural users share one printing device. In this case, recording sheets corresponding to print jobs of plural users are output to one printing device. The printing device sorts and outputs the recording sheets such that the users can know whose the recording sheets are and to which print job the recording sheets correspond.

SUMMARY

An aspect of the invention provides a print control method including: when a sorting method for sorting printed matters in a printing device is set, displaying an image indicating an output aspect of the printed matters output from the printing device, based on the set sorting method and a previous output aspect of the printing device.

BRIEF DESCRIPTION OF THE DRAWINGS

Exemplary embodiment(s) of the present invention will be described in detail based on the following figures, wherein

FIG. 10 is a diagram illustrating a set value table indicating a sorting set value;

DETAILED DESCRIPTION

First Exemplary Embodiment (Structure of Printing System)

Figure 1:
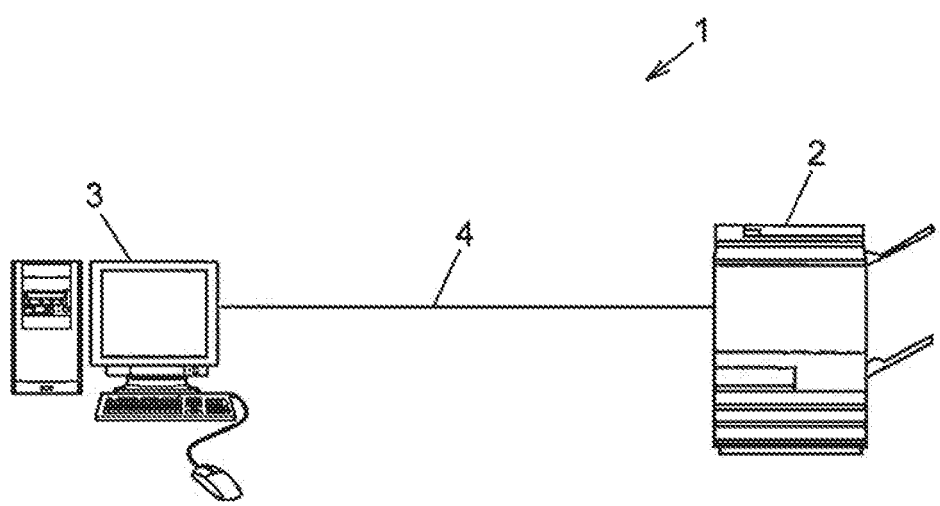
FIG. 1 is a diagram schematically illustrating an example of the structure of a printing system according to an exemplary embodiment.

FIG. 1 is a diagram schematically illustrating an example of the structure of a printing system according to this exemplary embodiment.

As an example of this exemplary embodiment, in a printing system 1, a terminal device 3 is connected to a printing device (printer) 2 through a transmission medium 4. For example, a wired medium, such as an electric cable or an optical cable, or a wireless medium, such as infrared rays or radio waves, can be used as the transmission medium 4.

(Printing Device)

The printing device 2 has a print function that performs printing based on print job information received from the terminal device 3 and outputs a printed matter. The printing device 2 may be a so-called multi-function machine that has a scanner function of optically scanning, for example, the plane of paper or a facsimile function, in addition to the print function. The printing device 2 has plural sheet tray mounting holes in order to sort and output printed recording sheets. Sheet trays into which plural recording sheets with different sizes are collected in different sheet feeding directions are attached to the printing device 2. In addition, the printing device 2 includes a standard discharging tray as a discharging tray and may further include an option discharging tray.

(Terminal Device)

The terminal device 3 is an information processing device that generates print job information in which a print instruction from a user is reflected and controls the operation of the printing device 2. The detailed structure of the terminal device 3 will be described below. The terminal device 3 includes a communication unit that communicates with an external device through the transmission medium 4, an operation unit, such as a touch pad for inputting an operation, a display unit, such as a liquid crystal display (LCD), a control unit, such as a central processing unit (CPU), and a storage unit that is a non-volatile memory such as a flash memory. The terminal device 3 is, for example, a personal computer. In addition, for example, a personal digital assistant (PDA) or a mobile phone may be used as the terminal device 3.

Next, the structure of the terminal device 3 as the information processing device will be described.

(Structure of Terminal Device as Information Processing Device)

Figure 2:
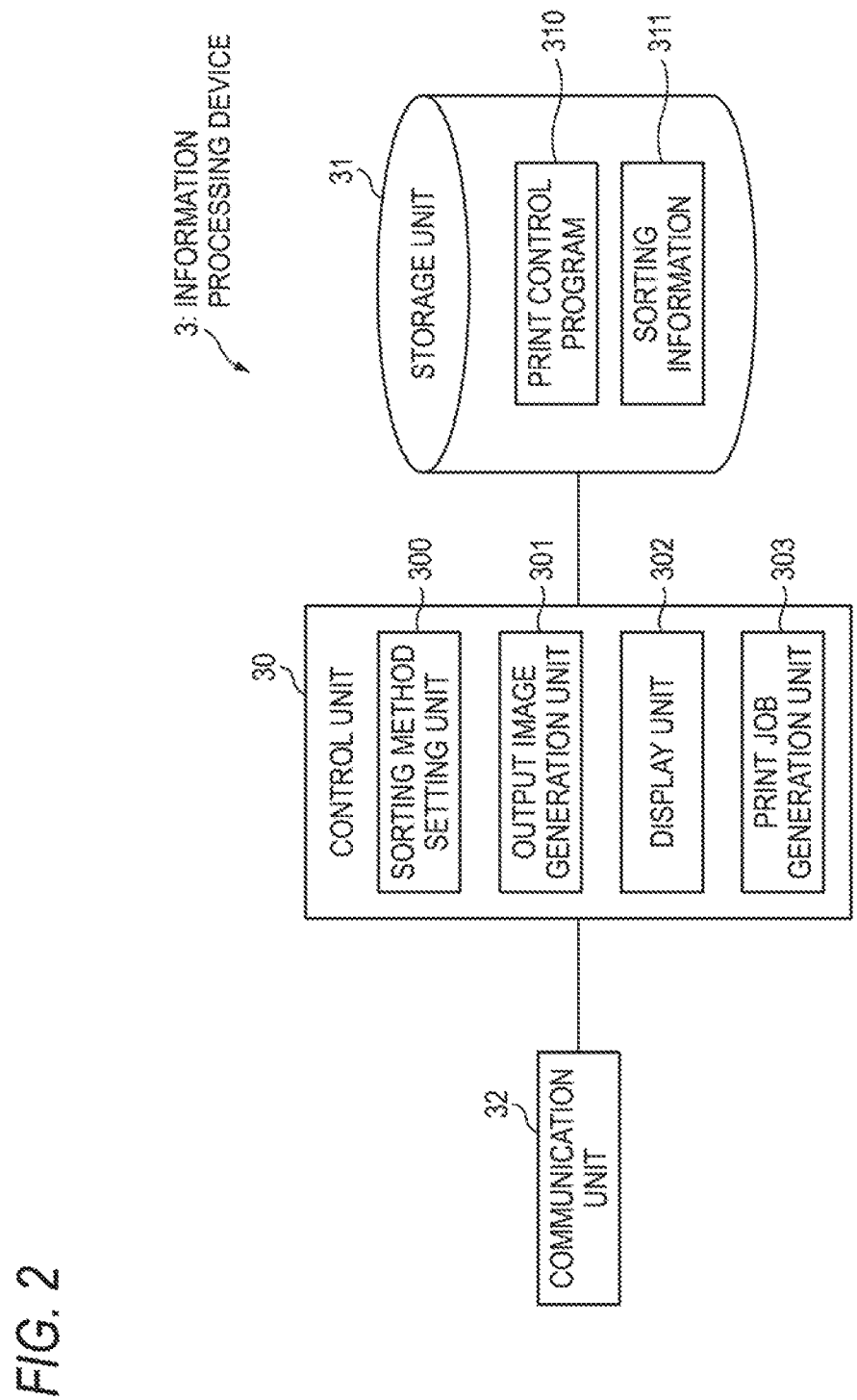
FIG. 2 is a block diagram illustrating an example of the structure of a terminal device according to this exemplary embodiment.

FIG. 2 is a block diagram illustrating an example of the structure of the terminal device 3 as the information processing device according to this exemplary embodiment.

The terminal device (information processing device) 3 includes a control unit 30 that is, for example, a CPU, controls the operation of each unit, and executes various programs, a storage unit 31 that is an example of a storage device which is a recording medium, such as a hard disk drive (HDD) or a flash memory, and stores information, and a communication unit 32 that communicates with the outside through the transmission medium 4.

The control unit 30 executes a print control program 310 which will be described below and functions as, for example, a sorting method setting unit 300, an output image generation unit 301, a display unit 302, and a print job generation unit 303.

The sorting method setting unit 300 sets a sorting method for sorting the printed matters from the printing device 2.

Examples of the sorting method include a method that sorts the printed matters using job separation and outputs the printed matters, a method that sorts and outputs the printed matters, using offsetting and discharging, and a method that switches a discharge destination to sort the printed matters and outputs the printed matters. For example, the sorting method using job separation sorts the printed matters in an output direction such that the feeding of recording sheets in the vertical and the feeding of recording sheets in the horizontal direction are switched for each print job and the printed matters are output. The sorting method using offsetting and discharging sorts the printed matters by shifting the discharge position of a recording sheet to the right or the left on one discharging tray for each unit of sorting in a print job. In addition, the sorting method using the switching between the discharge destinations outputs the recording sheets to each discharging tray and sorts the recording sheets for each print job when the printing device includes plural discharging trays.

The unit of sorting is, for example, a print job or a print attribute. In particular, in the case of the sorting method using job separation, it is possible to select a print job unit and an attribute unit. The print attributes include, for example, the name of an authenticated user, the name of a document, the name of a form file, or the name of an output sheet (the name of a recording sheet). The name of the authenticated user is used to identify a user when one terminal is used by plural users.

The sorting method set by the sorting method setting unit 300 is stored in sorting information 311 of the storage unit 31.

The output image generation unit 301 generates an image indicating an output aspect when the printed matters are output from the printing device 2 to the discharging tray by the sorting method set by the sorting method setting unit 300. For example, when the sorting method is job separation, the discharge direction of the printed matter onto the discharging tray is displayed.

The display unit 302 displays the image generated by the output image generation unit 301 on a display unit, such as an LCD, when the sorting method is set. Therefore, the user can recognize how the printed matter is output in response to the user's print instruction.

The print job generation unit 303 generates print job information which can be processed by the printing device 2 from print data (print original document) based on the content of the user's print instruction.

(Functional Structure of Information Processing Device)

Figure 3:
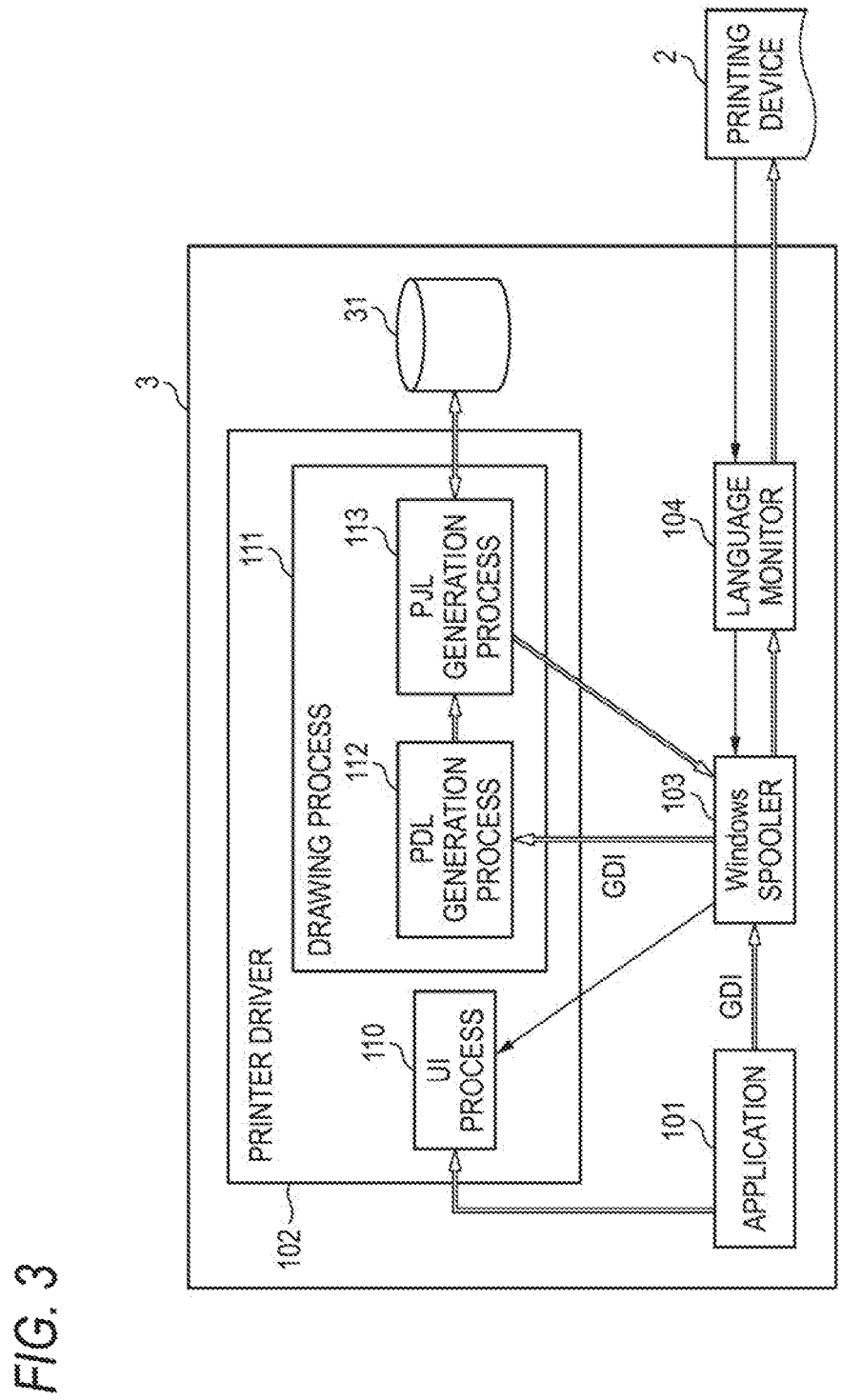
FIG. 3 is a block diagram illustrating the functional structure of an information processing device as the terminal device.

FIG. 3 is a block diagram illustrating the functional structure of the terminal device 3 as the information processing device. Hereinafter, the terminal device 3 is referred to as an information processing device 3. That is, the information processing device 3 illustrated in FIG. 3 indicates the software configuration of the terminal device 3 according to the above-described exemplary embodiment.

As illustrated in FIG. 3, in the information processing device 3, an application 101, a printer driver 102, a spooler (Windows (registered trademark) spooler) 103, and a language monitor 104 operate. In addition, the information processing device 3 includes the storage unit 31 that is an example of a storage device which is a hard disk drive (HDD) or a non-volatile memory, such as a flash memory, and stores information. In addition, the information processing device 3 includes a display unit such as an LCD.

The application 101 is a program that creates original document data and acquires the created original document data according to an operation of the user. When receiving print data from the application 101, the printer driver 102 generates data that can be processed by the printing device 2 and transmits the generated data to the printing device 2 through the spooler 103 and the language monitor 104.

The printer driver 102 has, as functions, a UI process 110 and a drawing process 111. The UI process 110 functions as a user interface between the users. The drawing process 111 includes a PDL generation process 112 and a PJL generation process 113 and generates a page description language and a printer job language, which are data that can be processed by the printing device 2, as the print job information from the received print data and attribute information associated with the print data.

The spooler 103 is a program that temporarily stores the print job information which is transmitted from the printer driver 102 to the printing device 2 through a graphic device interface (GDI) in response to a printing instruction, extracts the print job information according to a predetermined rule, and transmits the print job information to the language monitor 104. For example, a Windows (registered trademark) spooler illustrated in FIG. 3 can be used as the spooler 103.

The language monitor 104 performs bidirectional communication with the printing device 2, monitors the state of the printing device 2, and transmits the print job information to the printing device 2. The language monitor 104 transmits a query to the printing device 2 at a predetermined time interval and acquires, for example, the operation information of the printing device 2 (including information about the passage direction of sheets in the sorting of the previous print job) or the structure of the discharging tray. The information about the sorting of the previous print job acquired by the language monitor 104 is stored as the sorting information 311 in the storage unit 31.

When the user instructs printing using the application 101 in the information processing device 3, the UI process 110 of the printer driver 102 is called out and print setting is performed. When the user designates a printing instruction item, using the UI process 110, a sorting method for sorting the printed matters in the printing device 2 is set. The set sorting method is stored in the sorting information 311 of the storage unit 31. When printing starts after the print setting is performed, the GDI transmits print data and attribute information associated with the print data to the printer driver 102 through the spooler 103. In this way, printing is requested.

The drawing process 111 of the printer driver 102 generates the page description language (PDL) and the printer job language (PJL) from the received print data and the attribute information associated with the print data and transmits the languages as the print job information to the language monitor 104 through the spooler 103. The language monitor 104 transmits the print job received from the spooler 103 to the printing device 2. Then, the printing device 2 performs printing.

Before printing, the UI process 110 generates an image indicating the state of the printed matter to be output from the printing device 2 by the print job which will be performed from now, using the sorting information 311 of the storage unit 31. The image includes the state of the printed matter output by the previous print job, in addition to the state of the printed matter output by the current print job. Then, the UI process 110 displays the generated image on a display unit such as an LCD.

As such, the UI process 110 has the functions of the sorting method setting unit 300, the output image generation unit 301, and the display unit 302.

(Operation of Information Processing Device)

Next, the operation of the information processing device 3 according to the first exemplary embodiment will be described with reference to FIGS. 4 to 7.

Figure 4:
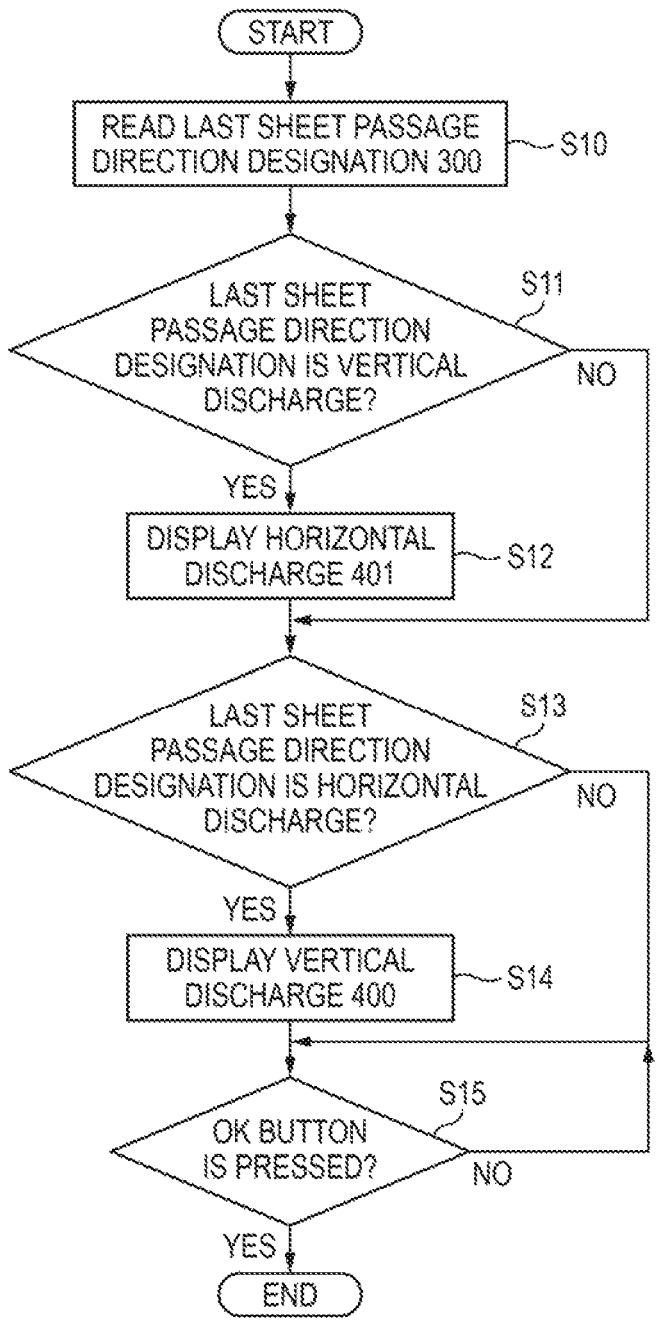
FIG. 4 is a flowchart illustrating the operation of a first exemplary embodiment of the information processing device.

FIG. 4 is a flowchart illustrating the operation of the information processing device 3 according to the first exemplary embodiment. In the first exemplary embodiment, when job separation is set as the sorting method, the sorting result obtained by job separation is displayed to the user during the setting of the sorting method.

Figure 5:
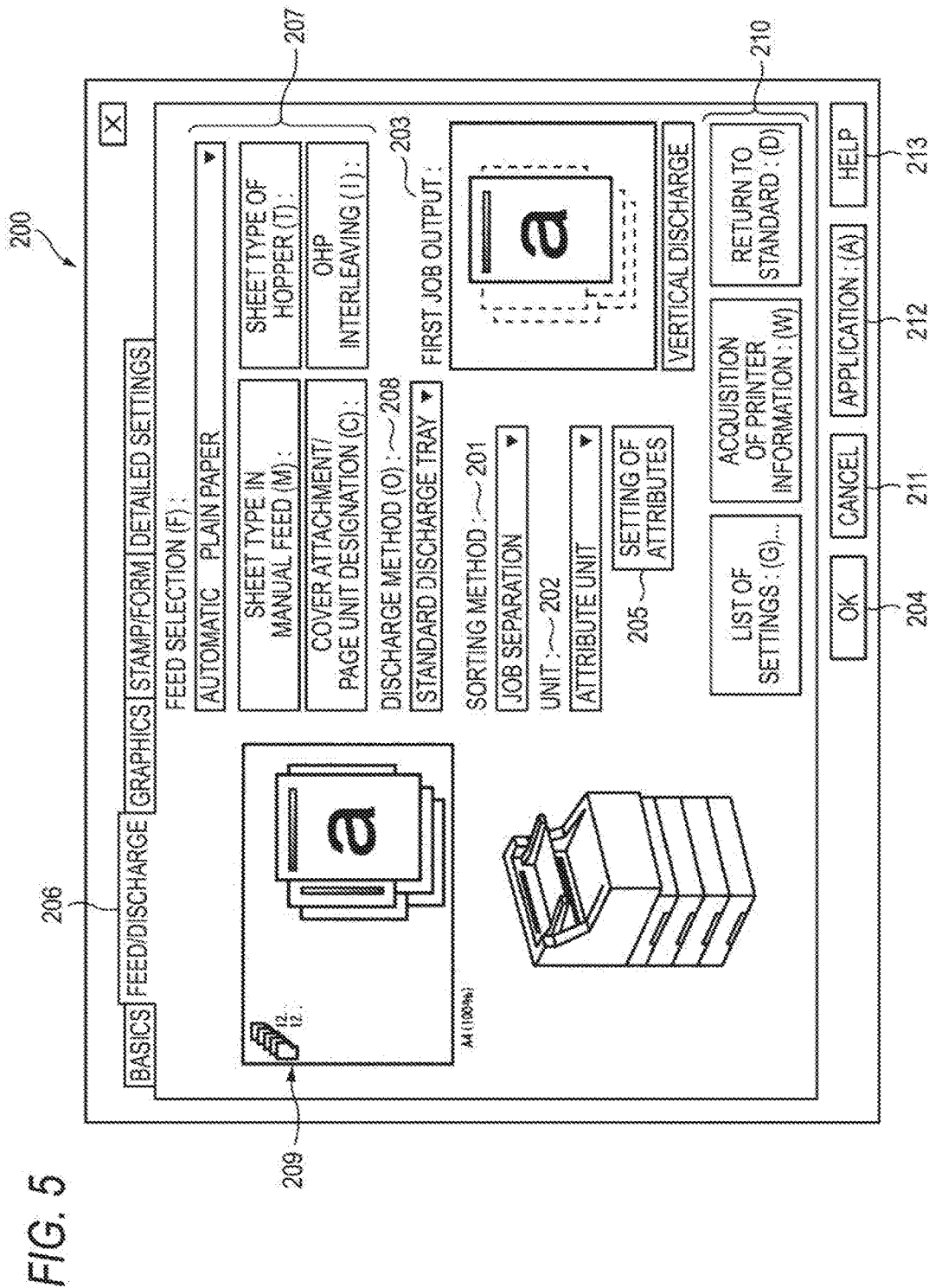
FIG. 5 is a diagram illustrating an example of a sorting setting screen of a GUI screen of a printer driver.

FIG. 5 is a diagram illustrating an example of a sorting setting screen of a GUI screen of the printer driver 102. When instructing printing, first, the user sets a sorting method through the GUI screen. When a sheet feeding/discharge tag 206 which is provided in an upper part of a sorting setting screen 200 illustrated in FIG. 5 is selected, a dialogue screen is displayed. A sheet feed selection button 207 for selecting, for example, whether a sheet feed mode is an automatic feed mode or a manual feed mode and the type of sheet in the manual feed mode is arranged in an upper right portion of the sorting setting screen 200 and a discharge destination selection button 208 for selecting a discharge destination is arranged below the sheet feed selection button 207. In addition, a display field 209 indicating a printing state is arranged in an upper left portion of the screen.

A sorting method selection button 201 for selecting a sorting method is arranged substantially at the center of the sorting setting screen 200 and a unit selection button 202 for selecting the unit of sorting is arranged below the sorting method selection button 201. An attribute setting button 205 which is available when an attribute unit is selected as the unit of sorting is arranged below the unit selection button 202. The attribute setting button 205 is a button for setting the attribute unit.

A first job output display field 203 in which the sorting result is displayed as an image is arranged on the right side of the attribute setting button 205. Here, the "first job output" includes a print job that is output immediately after some print jobs are output, in addition to the first print job among all of the print jobs. Hereinafter, the meaning of the term "first" holds for the following description. A button 210 for, for example, browsing settings and acquiring printer information is arranged below the first job output display field 203. An OK button 204 for reflecting the settings and closing the screen, a cancel button 211 for cancelling the settings, an application button 212 for reflecting the settings and maintaining the display of the screen, and a help button 213 for acquiring information about settings are arranged in the lowest portion of the sorting setting screen 200.

In this example, as illustrated in the sorting setting screen 200 of FIG. 5, job separation is selected by the sorting method selection button 201 and a job unit is selected as the unit of sorting by the unit selection button 202.

Figures 6, 7:
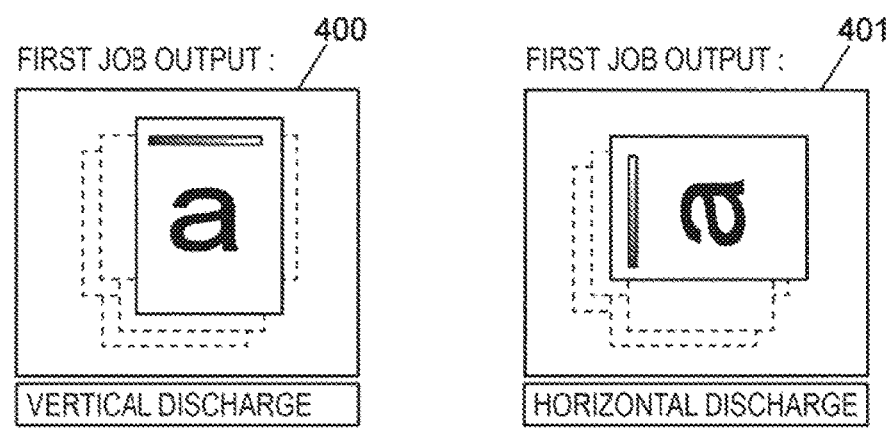
FIG. 6 is a diagram illustrating the content of the passage direction designation of a printed matter stored in sorting information.
FIG. 7 is a diagram illustrating a display screen of a GUI that enables a user to visually check the output result of the next first print job when a sorting method is a job separation method.

FIG. 6 is a diagram illustrating the content of the passage direction designation of the last printed matter output by the sorting method using job separation in the previous print job, which is stored in the sorting information 311 of the storage unit 31. As illustrated in FIG. 6, it is designated whether last sheet passage direction designation 300 is the vertical direction or the horizontal direction when the sorting function is job separation.

FIG. 7 is a diagram illustrating an example of an image related to a display screen of the GUI that enables the user to visually check the output result of the next first print job to be printed. As illustrated in FIG. 7, when the output of the next first print job is discharged in the vertical direction, a vertical discharge screen 400 is displayed. When the output of the next first print job is discharged in the horizontal direction, a horizontal discharge screen 401 is displayed. As such, the output of the next first print job is represented by a solid line and is displayed at the top and the outputs of the previous print jobs are represented by dotted lines and are displayed below the first print job. This display makes it possible for the user to check the positional relationship between the current printed matter and the previous printed matter.

When the user instructs printing, in the flowchart illustrated in FIG. 4, the UI process 110 of the printer driver 102 reads the last sheet passage direction designation 300 of the print job which has been previously output by the sorting method using job separation in the printing device 2 from the sorting information 311 of the storage unit 31 (S10).

Then, it is determined whether the read last sheet passage direction designation 300 is vertical discharge (discharge in the vertical direction) (S11). When the last sheet passage direction designation 300 is vertical discharge (S11; Yes), a horizontal discharge screen 401 is displayed as a first job output illustrated in FIG. 7 is displayed on the sorting setting screen 200 illustrated in FIG. 5 (S12).

When the last sheet passage direction designation 300 is not the vertical discharge (S11; No) and after the horizontal discharge screen 401 is displayed (S12), it is determined whether the last sheet passage direction designation 300 is horizontal discharge (discharge in the horizontal direction) (S13). When the last sheet passage direction designation 300 is the horizontal discharge (S13; Yes), the vertical discharge screen 400 is displayed as the first job output illustrated in FIG. 7 is displayed on the sorting setting screen 200 illustrated in FIG. 5 (S14).

In the above-mentioned process, a sheet passage direction different from the previous sheet passage direction (horizontal discharge when the last sheet passage direction designation 300 is vertical discharge; or vertical discharge when the last sheet passage direction designation 300 is horizontal discharge) is displayed as the first job output 203 on the sorting setting screen 200. In the example illustrated in FIG. 5, when the last sheet passage direction designation 300 is the horizontal discharge, the vertical discharge screen 400 is displayed as the first job output 203.

When the last sheet passage direction designation 300 is not the horizontal discharge (S13; No) and after the vertical discharge screen 400 is displayed (S14), it is determined whether the OK button 204 has been pressed (S15). When the OK button 204 has been pressed (S15; Yes), the actual printing starts. When the OK button 204 has not been pressed (S15; No), it is checked whether the OK button 204 has been pressed again.

When the actual printing starts, the printer driver 102 generates the printer job language of the sheet passage direction displayed in the first job output 203 on the sorting setting screen 200 illustrated in FIG. 5 as the attribute information of the print job information together with the page description language of the print job information to be output to the printing device 2 and outputs the printer job language to the printing device 2. The printing device 2 receives the printer job language and performs sort printing using job separation, as displayed in the first job output 203.

When the printer driver 102 generates the printer job language of the sheet passage direction displayed in the first job output 203, information about the sheet passage direction displayed in the first job output 203 is recorded as the sheet passage direction of the print job output by job separation in the last sheet passage direction designation 300 (see FIG. 6) of the sorting information 311 in the storage unit 31.

(Effect of First Exemplary Embodiment)

According to the first exemplary embodiment, the printer driver 102 controls the vertical and horizontal discharge directions of the printed matter in the sorting method using job separation. The sorting result obtained by the job separation in the printing device 2 is displayed as an image on, for example, the GUI screen of the printer driver 102 when sorting is set.

Second Exemplary Embodiment

Next, a second exemplary embodiment will be described. In the second exemplary embodiment, when a sorting method is job separation and the unit of sorting is print attributes, the sorting result is displayed to the user during the setting of sorting. A printing system 1 and an information processing device 3 according to the second exemplary embodiment has the same structure as those according to the first exemplary embodiment.

Figure 8:
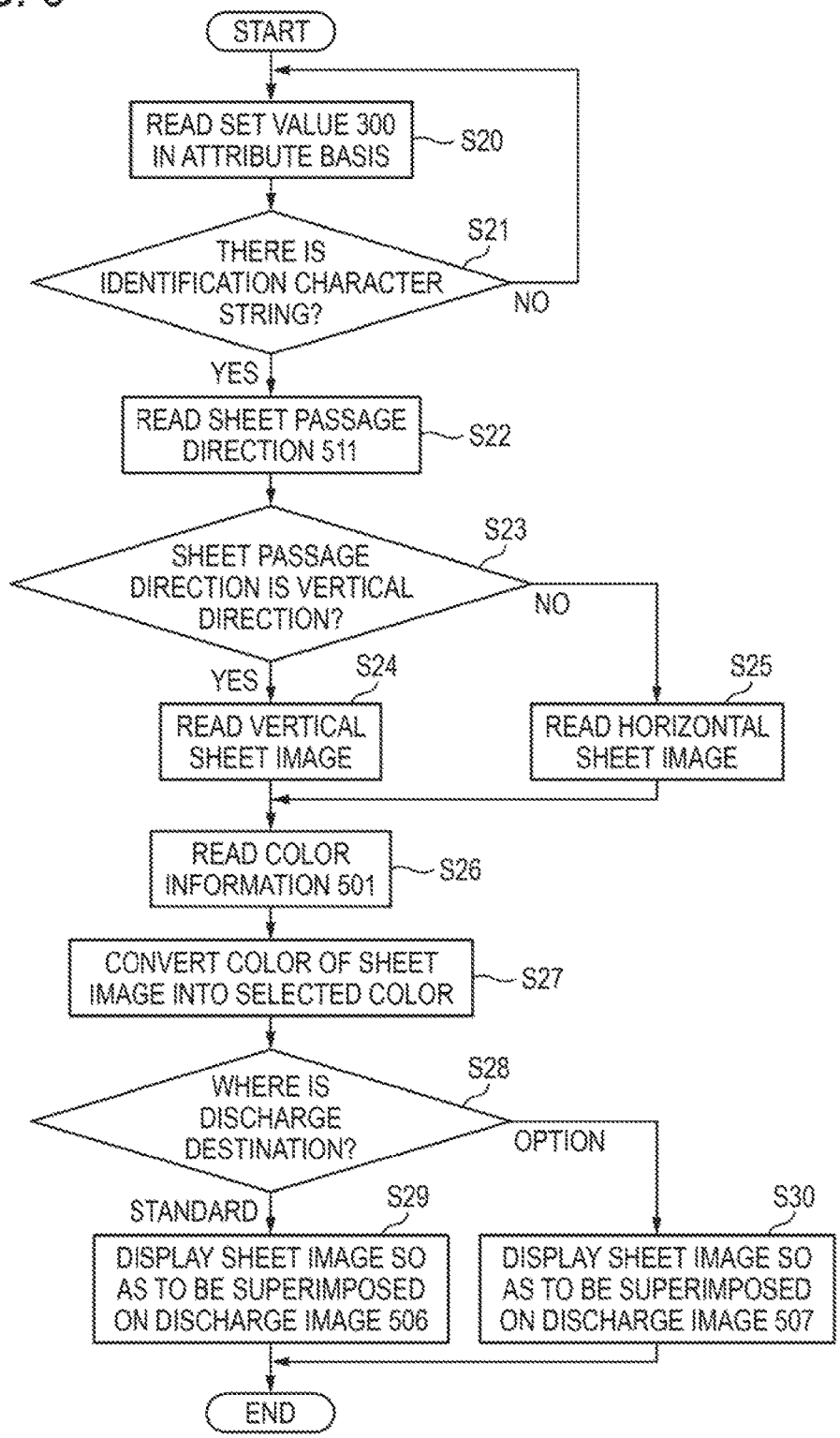
FIG. 8 is a flowchart illustrating the operation of a second exemplary embodiment of the information processing device.

FIG. 8 is a flowchart illustrating the operation of the information processing device 3 according to the second exemplary embodiment. Next, the operation of the information processing device 3 according to the second exemplary embodiment will be described with reference to the flowchart.

In the second exemplary embodiment, the unit of sorting is print attributes. Therefore, in the setting of a sorting method in an attribute unit, on the sorting setting screen 200 illustrated in FIG. 5, job separation is selected by the sorting method selection button 201 and the attribute unit is selected by the unit selection button 202 for job separation. When the attribute unit is selected as the unit of sorting, the printer driver 102 validates the attribute setting button 205 on the sorting setting screen 200. When the attribute setting button 205 is pressed, an attribute setting screen is displayed.

Figure 9:
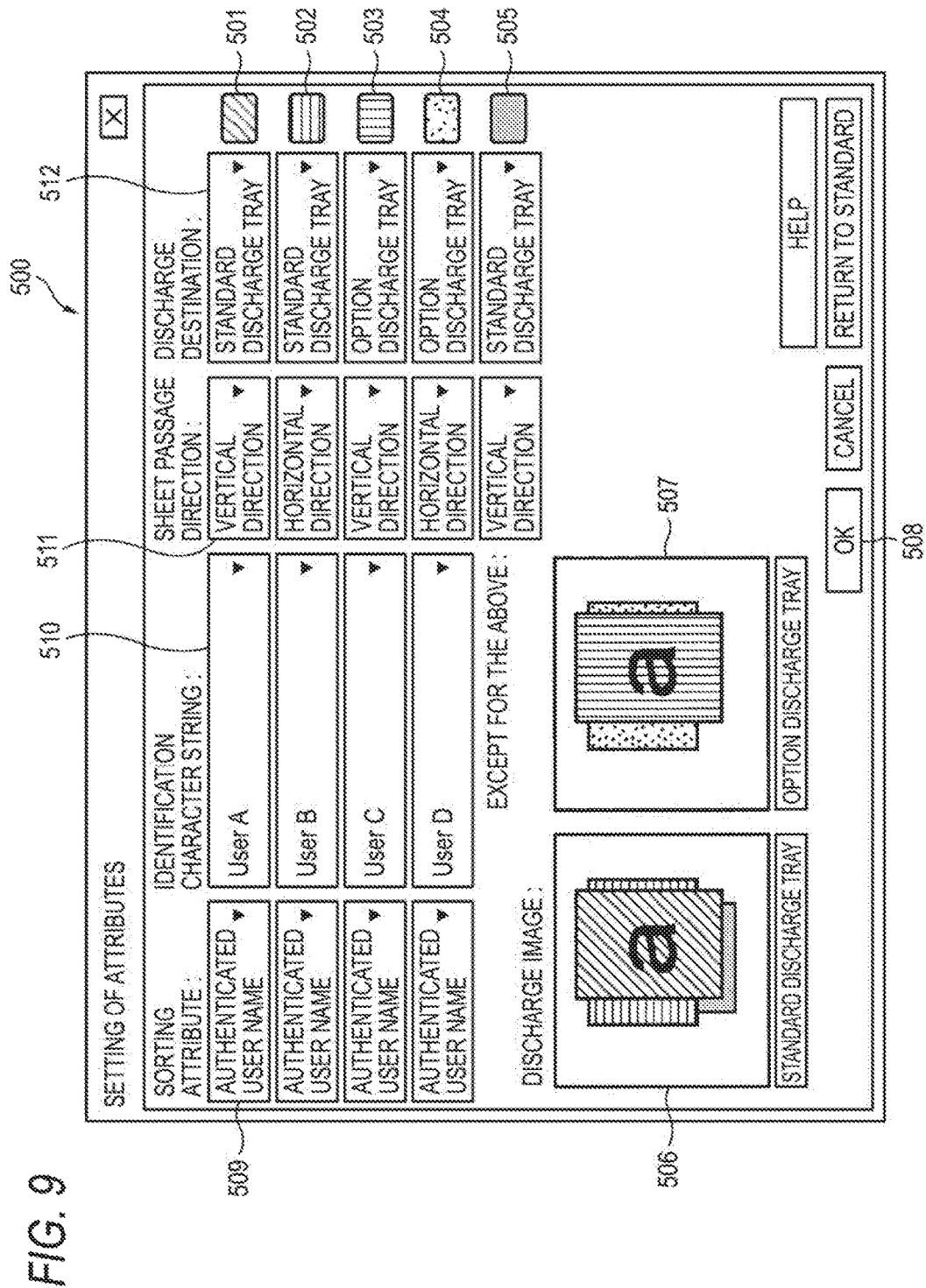
FIG. 9 is a diagram illustrating a sorting setting screen in the setting of attributes.

FIG. 9 is a diagram illustrating a sorting setting screen in the setting of attributes. Which print attributes are used for sorting using job separation is set by the sorting setting screen 500 in the setting of attributes illustrated in FIG. 9. A set value for setting a sorting method is stored in the sorting information 311 of the storage unit 31. FIG. 10 illustrates a set value table indicating a sorting set value.

In the flowchart illustrated in FIG. 8, when the attribute setting button 205 is pressed on the sorting setting screen 500, a set value table 600 illustrated in FIG. 10 is read from the storage unit 31 (S20). The read set value is reflected in the sorting setting screen 500 in the unit of attributes.

For example, on the sorting setting screen 500, in setting 1, a sorting attribute 509 is an authenticated user name, an identification character string 510 is a user A, a sheet passage direction 511 is the vertical direction, and a discharge destination 512 is a standard discharging tray, which are sequentially arranged from the top. In setting 2, the sorting attribute 509 is an authenticated user name, the identification character string 510 is a user B, the sheet passage direction 511 is the horizontal direction, and the discharge destination 512 is the standard discharging tray. In setting 3, the sorting attribute 509 is an authenticated user name, the identification character string 510 is a user C, the sheet passage direction 511 is the vertical direction, and the discharge destination 512 is an option discharging tray.

When each discharge image is displayed, for example, different colors (patterns) 501, 502, and 503 correspond to each printed matter such that the printed matters for each attribute are identified.

Then, it is determined whether there is an identification character string (S21). When there is an identification character string (S21; Yes), the sheet passage direction 511 is read (S22). When there is no identification character string (S21; No), the set value table 600 for the attribute unit is read again (S20).

Then, it is determined whether the sheet passage direction 511 is the vertical direction (S23). When the sheet passage direction 511 is the vertical direction (S23; Yes), a vertical sheet image is read in order to generate the discharge image (S24). When the sheet passage direction 511 is not the vertical direction (S23; No), a horizontal sheet image is read in order to generate the discharge image (S25).

Then, for example, color information (pattern information) 501 which is associated with each sorting attribute 509 in order to identify the printed matters for each attribute in the discharge image is read (S26). The color of each sheet image is converted into a color that is associated with each attribute and is selected in the discharge image (S27).

Then, the discharge destination 512 is determined (S28). When the discharge destination 512 is the standard discharging tray (S28; standard), a generated sheet image is displayed so as to be superimposed on a discharge image 506 on the sorting setting screen 500 (S29). When the discharge destination 512 is the option discharging tray (S28; option), a generated sheet image is displayed so as to be superimposed on a discharge image 507 on the sorting setting screen 500 (S30).

As such, when sorting is set in the attribute unit, the sorting results obtained by the setting of the sheet passage direction 511 and the discharge destination 512 are displayed on the discharge images 506 and 507 such that the user can check the sorting results in the printing device 2 through the sorting setting screen 500 for the attribute unit. Sorting in the attribute unit can be set for plural attributes and the color information items 501 to 505 can be set from the set value table 600 in the setting of each attribute unit. Therefore, the color information items 501 to 505 can be changed to any color such that the relationship between the attribute information and the discharge result can be determined based on the sorting results of the discharge images 506 and 507.

When the user checks the sorting results through the sorting setting screen 500 and presses an OK button 508, the actual printing starts. When printing starts, the printer driver 102 generates the page description language of the print job information to be output to the printing device 2 and determines whether the identification character string 510 of the sorting attribute 509 is included in the attribute information of the print job information. When the identification character string 510 of the sorting attribute 509 is included in the attribute information of the print job information, the printer job language of the sheet passage direction and the discharge destination is generated with the setting of the sheet passage direction 511 and the discharge destination 512 and is output to the printing device 2. Then, the printing device 2 performs sort printing.

When the printer driver 102 generates the printer job language of the sheet passage direction and the discharge destination, each set value of the sorting setting screen 500 for the attribute unit is recorded in the set value table 600 of the sorting information 311 in the storage unit 31.

(Effect of Second Exemplary Embodiment)

According to the second exemplary embodiment, sorting using job separation in the attribute unit is set through the sorting setting screen of the GUI. Therefore, even if a combination of job separations in the attribute unit is complicated, the sorting result during the setting of sorting is displayed as an image. In particular, outputs for each attribute are represented by different colors. Therefore, the printed matters corresponding to each attribute are displayed as images on, for example, the GUI screen of the printer driver 102 so as to be distinguished from each other.

Third Exemplary Embodiment

Next, a third exemplary embodiment of the present invention will be described. In the third exemplary embodiment, even if a sorting method is an offsetting and discharging method or a discharge destination switching method other than job separation, the sorting result is displayed during the setting of sorting. A printing system 1 and an information processing device 3 according to the third exemplary embodiment have the same structure as those according to the first exemplary embodiment.

Figure 11:
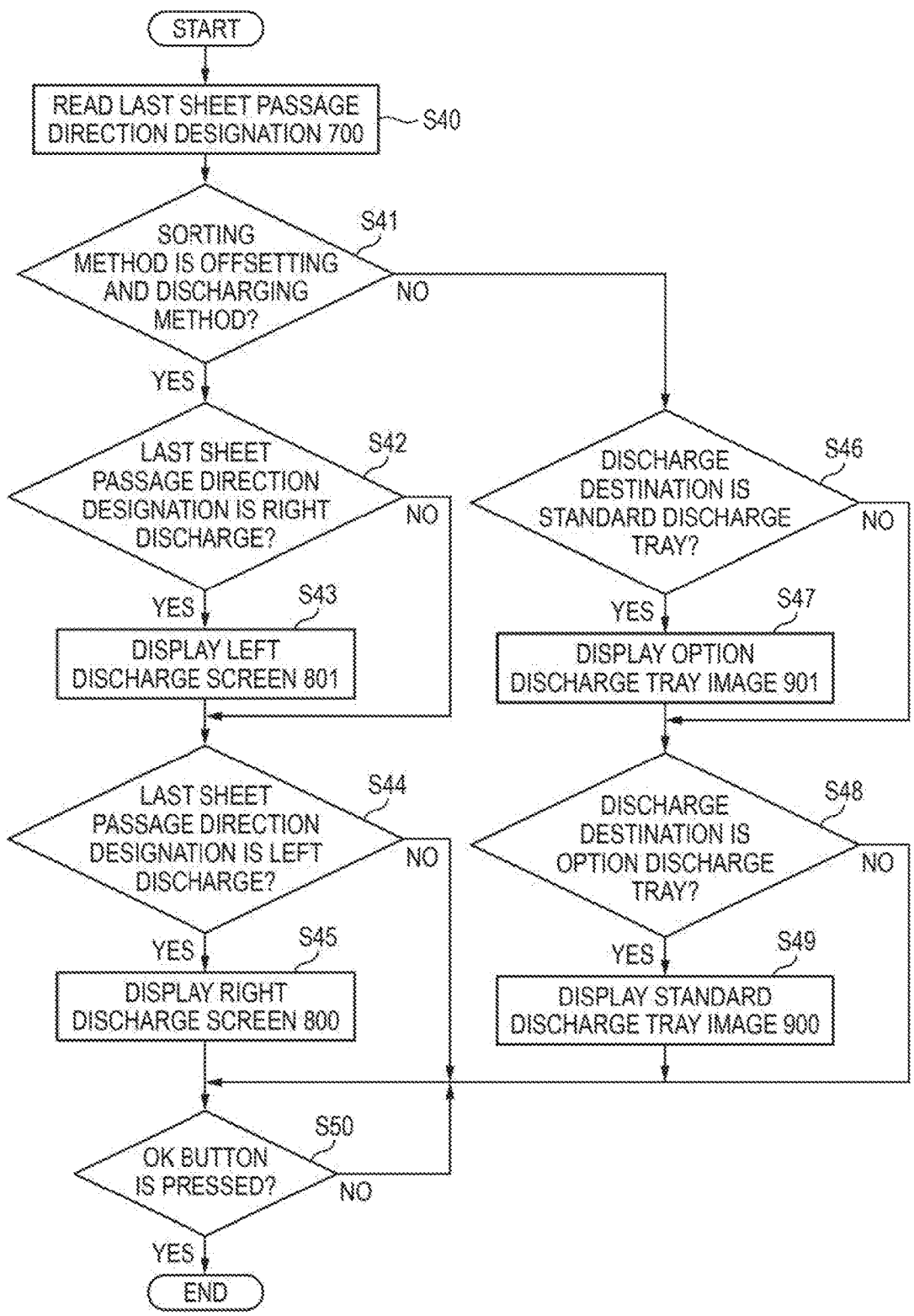
FIG. 11 is a flowchart illustrating the operation of a third exemplary embodiment of the information processing device.

FIG. 11 is a flowchart illustrating the operation of the information processing device 3 according to the third exemplary embodiment. Next, the operation of the information processing device 3 according to the third exemplary embodiment will be described with reference to the flowchart.

Similarly to the first exemplary embodiment, when the user instructs printing, in the flowchart illustrated in FIG. 11, the UI process 110 of the printer driver 102 reads last sheet passage direction designation 700 of print job information which has been previously output by the printing device 2 from the sorting information 311 of the storage unit 31 (S40).

Figures 12, 13:
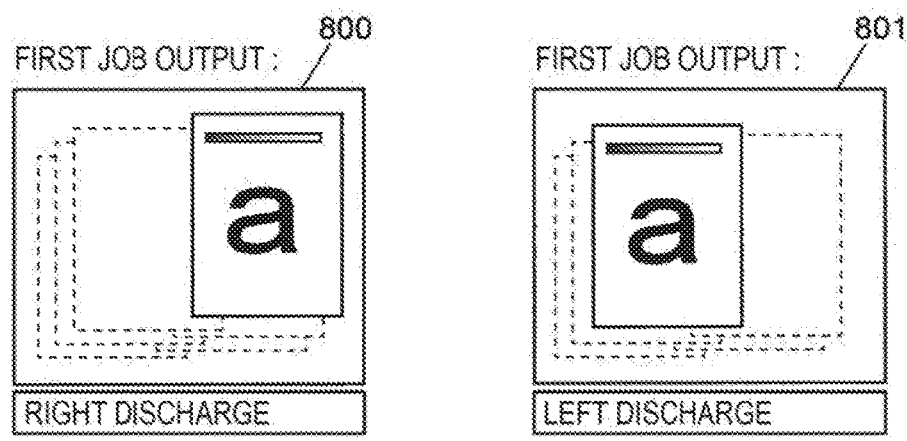
FIG. 12 is a diagram illustrating the content of the passage direction designation of a printed matter stored in sorting information.
FIG. 13 is a diagram illustrating a display screen of a GUI that enables a user to visually check the output result of the next first print job when the sorting method is an offsetting and discharging method.

FIG. 12 is a diagram illustrating the content of the sheet passage direction designation 700 of the last printed matter output by sorting in the previous print job, which is stored in the sorting information 311 of the storage unit 31, similarly to FIG. 6. As illustrated in FIG. 12, offsetting and discharging 701 and discharge destination switching 702 are set as a sorting function. Whether the last sheet passage direction designation 700 is "a right direction or a left direction" and is "a standard discharging tray or an option discharging tray" is set according to each sorting method.

Then, it is determined whether the sorting method is an offsetting and discharging method (S41). When the sorting method is the offsetting and discharging method (S41; Yes), it is determined whether the last sheet passage direction designation 700 is right discharge (S42). That is, it is determined whether a printed matter is discharged to the right side of the discharging tray in the discharging tray of the printing device 2.

FIG. 13 is a diagram illustrating an example of an image related to a display screen of the GUI that enables the user to visually check the output result of the next first print job to be printed. In the case of the right discharge, a right discharge screen 800 is selected. In the case of left discharge, a left discharge screen 801 is displayed.

When the last sheet passage direction designation 700 is right discharge (S42; Yes), the left discharge screen 801 is displayed as the next first job output (S43). When the last sheet passage direction designation 700 is not the right discharge (S42; No) and after the left discharge screen 801 is displayed (S43), it is determined whether the last sheet passage direction designation 700 is left discharge (S44).

Then, when the last sheet passage direction designation 700 is the left discharge (S44; Yes), the right discharge screen 800 is displayed as the next first job output (S45). When the last sheet passage direction designation 700 is not the left discharge (S44; No), the left discharge screen 801 is displayed (S43) and it is determined whether the OK button 204 has been pressed (S50).

On the other hand, when the sorting method is not the offsetting and discharging method (S41; No), the sorting method is a discharge destination switching method and it is determined whether the discharging tray is the standard discharging tray (S46).

Figure 14:
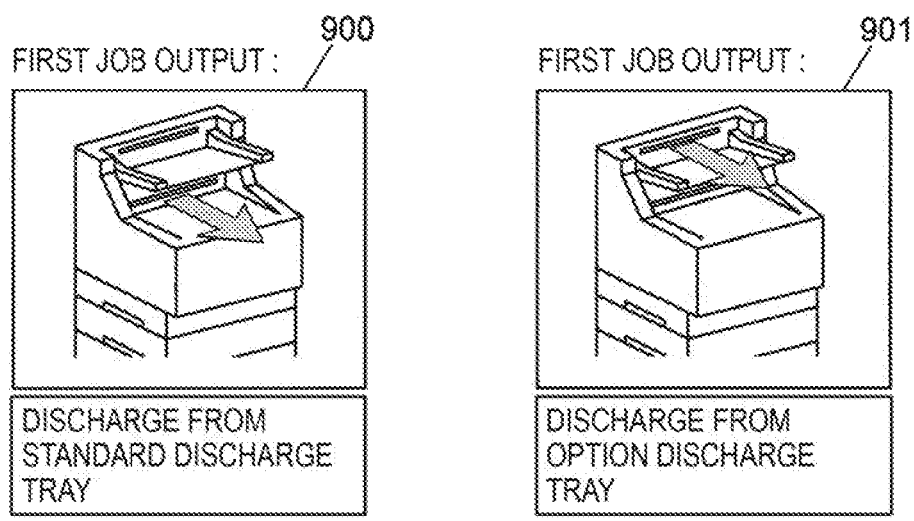
FIG. 14 is a diagram illustrating a display screen of a GUI that enables a user to visually check the output result of the next first print job when the sorting method is a discharge destination switching method.

In this case, an image indicating a discharge destination tray is prepared as a display image indicating the next first job output which is displayed on the sorting setting screen 200 illustrated in FIG. 5. FIG. 14 is a diagram illustrating an example of an image related to a display screen of the GUI that enables the user to visually check the output result of the next first print job to be printed when the sorting method is the discharge destination switching method. As illustrated in FIG. 14, a standard discharging tray image 900 and an option discharging tray image 901 are prepared.

When the discharge destination is the standard discharging tray (S46; Yes), the option discharging tray image 901 is displayed as the next first job output (S47). When the discharge destination is not the standard discharging tray (S46; No) and after the option discharging tray image 901 is displayed as the next first job output (S47), it is determined whether the discharge destination is the option discharging tray (S48).

When the discharge destination is the option discharging tray (S48; Yes), the standard discharging tray image 900 is displayed as the first job output (S49). When the discharge destination is not the option discharging tray (S48; No), the option discharging tray image 901 is displayed (S47). In any case, when the image of the first job output is displayed on the sorting setting screen 200, it is determined whether the OK button 204 has been pressed (S50). When the OK button 204 has been pressed (S50; Yes), the actual printing starts. When the OK button 204 has not been pressed (S50; No), it is checked whether the OK button 204 has been pressed again.

(Effect of Third Exemplary Embodiment)

According to the third exemplary embodiment, even in the sorting method, such as the offsetting and discharging method or the discharge destination switching method, other than job separation, before the actual printing starts, the sorting result is displayed as an image indicating a detailed discharge destination on, for example, the GUI screen of the printer driver 102.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a program causing a computer to execute a process for print control, the process comprising:
   setting, by a processor and associated memory of the computer, a sorting method for sorting printed matters in a printing device; and
   when the sorting method is set, displaying on a display an image indicating an output mode of the printed matters output from the printing device, based on the set sorting method and a previous output mode of the printing device, wherein the sorting method is any one of the following:
   (i) a job separation method that alternately changes an output direction of the printed matters to sort the printed matters;
   (ii) an offsetting and discharging method that alternately shifts an output position of the printed matters to a left side and a right side on a discharging tray to sort the printed matters; and
   (iii) a discharge destination switching method that switches the discharging tray to another discharging tray to sort the printed matters.

2. The non-transitory computer readable medium according to claim 1, wherein the display displays the previous output mode of the printing device together with the image indicating the output mode of the printed matters.

3. The non-transitory computer readable medium according to claim 1, wherein, when the sorting method is the job separation method and a unit of sorting is a print attribute, the display displays an image in which the printed matters corresponding to respective print attributes are identified as the image indicating the output mode of the printed matters.

4. An information processing device comprising:
   a processor and associated memory that set a sorting method for sorting printed matters in a printing device; and
   a display that, when the sorting method is set, displays an image indicating an output mode of the printed matters output from the printing device, based on the set sorting method and a previous output mode of the printing device,
   wherein the sorting method is any one of the following:
   (i) a job separation method that alternately changes an output direction of the printed matters to sort the printed matters;
   (ii) an offsetting and discharging method that alternately shifts an output position of the printed matters to a left side and a right side on a discharging tray to sort the printed matters; and
   (iii) a discharge destination switching method that switches the discharging tray to another discharging tray to sort the printed matters.

5. A print control method comprising:
   setting, by a processor and associated memory, a sorting method for sorting printed matters in a printing device; and
   when the sorting method is set, displaying on a display an image indicating an output mode of the printed matters output from the printing device, based on the set sorting method and a previous output mode of the printing device, wherein the sorting method is any one of the following:
   (i) a job separation method that alternately changes an output direction of the printed matters to sort the printed matters;
   (ii) an offsetting and discharging method that alternately shifts an output position of the printed matters to a left side and a right side on a discharging tray to sort the printed matters; and
   (iii) a discharge destination switching method that switches the discharging tray to another discharging tray to sort the printed matters.

* * * * *